United States Patent [19]

Tanamachi et al.

[11] Patent Number: 5,250,890
[45] Date of Patent: Oct. 5, 1993

[54] INVERTER CONTROL APPARATUS

[75] Inventors: Tokunosuke Tanamachi; Kiyoshi Nakamura, both of Katsuta; Kiyoshi Nakata, Ibaraki; Yoshio Tsutsui; Wataru Miyake, both of Katsuta; Katsuaki Suzuki, Kitaibaraki, all of Japan

[73] Assignee: Hitachi, Ltd., Tokyo, Japan

[21] Appl. No.: 201,449

[22] Filed: Jun. 2, 1988

[30] Foreign Application Priority Data

Jun. 3, 1987 [JP] Japan .................. 62-138089
Sep. 30, 1987 [JP] Japan .................. 62-243804

[51] Int. Cl.$^5$ .................. H02P 5/40
[52] U.S. Cl. .................. 318/811; 388/811; 318/807; 363/41; 363/98
[58] Field of Search .................. 318/811, 599, 803, 805, 318/807, 810, 802, 599; 388/811, 831; 363/37, 41, 95, 135, 97, 79, 98, 136

[56] References Cited

U.S. PATENT DOCUMENTS

| | | | |
|---|---|---|---|
| 3,753,063 | 8/1973 | Graf | 318/806 |
| 3,829,754 | 8/1974 | Rettig | 363/46 |
| 3,935,518 | 1/1976 | Yatsuk et al. | 318/805 |
| 4,054,818 | 10/1977 | Risberg | 318/807 |
| 4,409,534 | 10/1983 | Bose | 318/811 |
| 4,480,299 | 10/1984 | Muto | 318/811 |
| 4,527,226 | 7/1985 | Glennon | 363/41 |
| 4,723,201 | 2/1988 | Tanamachi et al. | 318/811 |
| 4,788,485 | 11/1988 | Kawagishi et al. | 318/811 |

FOREIGN PATENT DOCUMENTS 61-48356 5/1981 Japan .

Primary Examiner—William M. Shoop, Jr.
Assistant Examiner—John W. Cabeca
Attorney, Agent, or Firm—Antonelli, Terry, Stout & Kraus

[57] ABSTRACT

In an inverter control apparatus including a pulse width modulation inverter supplied with power from a d.c. power source to generate an a.c. output, a frequency control unit controlling the output frequency of the inverter, and a voltage control unit controlling the output voltage of the inverter, a frequency adjusting unit is provided to adjust the operating frequency of the inverter so that the product of voltage and time in each positive half cycle of the output voltage of the inverter becomes equal to that in the next adjacent negative half cycle of the output voltage of the inverter. When the inverter is used in an apparatus for controlling an induction motor, the frequency adjusting unit adjusts the output frequency of the inverter according to the result of detection of a ripple factor of an input voltage of the inverter, and a frequency adjusting-factor correcting unit corrects the frequency adjusting factor of the frequency adjusting unit according to at least one of the output of an induction-motor rotation frequency detector and the output of the voltage control unit.

31 Claims, 10 Drawing Sheets

FIG. 2A OUTPUTS OF 71 AND 72

FIG. 2B OUTPUT OF 73

FIG. 2C OUTPUT VOLTAGE OF 4 (U-V VOLTAGE)

fe >> fo fe ≒ fo fe << fo

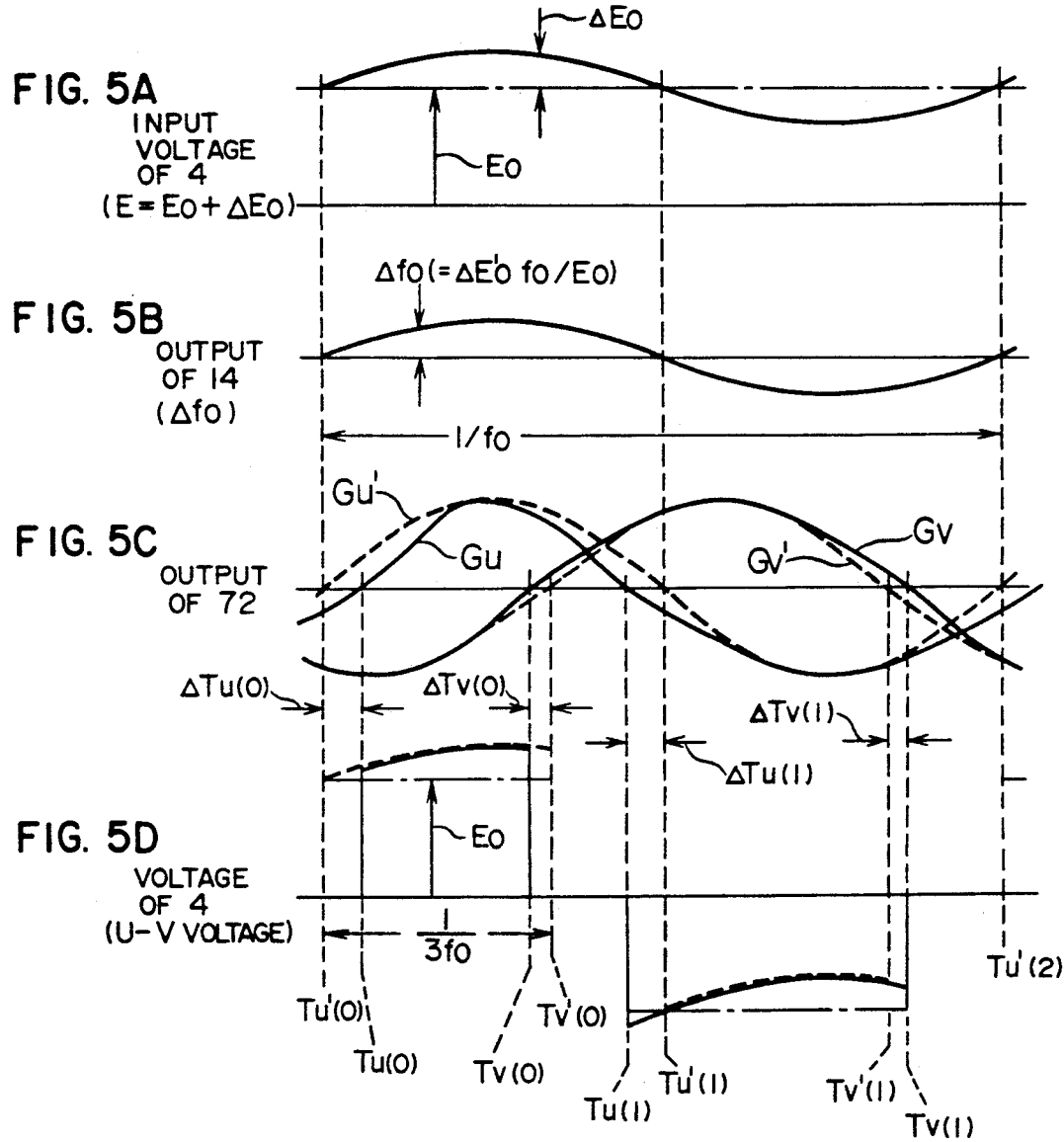

f = f₀
(NO Δf₀)

f = f₀ + Δf₀,
α = 0° IN
EQUATION (2)

f = f₀ + Δf₀,
α = -5° IN
EQUATION (2)

INPUT VOLTAGE E OF 4, WITHOUT PULSATING COMPONENT $\Delta E_0$

INPUT VOLTAGE E OF 4, WITH PULSATING COMPONENT $\Delta E_0$

5,250,890

INVERTER CONTROL APPARATUS

BACKGROUND OF THE INVENTION

This invention relates to an inverter control apparatus, and more particularly to an apparatus suitable for controlling an inverter which converts a d.c. output voltage of an a.c.-d.c. converter into a variable a.c. voltage having a variable frequency.

Japanese Patent Publication No. 61-48356 (1986) is known as one of prior art publications disclosing a control method of this kind. Japanese Patent Publication No. 41-48356 notices the fact that, when an a.c.-d.c. converter converts an a.c. voltage into a d.c. voltage, and the d.c. output voltage of the converter is applied to a pulse width modulation inverter to be converted into a variable a.c. voltage having a variable frequency (VVVF), the output voltage of the inverter pulsates, and, especially, a beat phenomenon occurs at a specific output frequency of the inverter, because the output voltage of the a.c.-d.c. converter, that is, the input voltage of the inverter includes a pulsating component (rectification ripples occurred during rectification). According to the method disclosed in Japanese Patent Publication No. 61-48356 which solves the above problem, the ratio between the amplitude of a sine wave signal and that of a carrier signal of triangular waveform, that is, the pulse width of a PWM signal is adjusted to deal with a variation of the inverter input voltage, so that the inverter output voltage can be freed from any variation.

Also, JP-A-57-52383 proposed to attain the same object discloses a method of controlling a PWM inverter in which a pulse processing technique is used so as to adjust the pulse width of the PWM signal to deal with a variation of the inverter input voltage.

However, these prior art control methods have such a disadvantage that the desired control is not applicable to a voltage range in which the output voltage of the inverter attains its maximum level and any further voltage control is impossible. That is, the desired control is not applicable because the number of pulses included in one cycle of the inverter output voltage is only one, and the inverter output voltage is maintained constant at its maximum level.

SUMMARY OF THE INVENTION

It is an object of the present invention to provide an apparatus for controlling an inverter so as to minimize an undesirable beat phenomenon of an inverter output voltage attributable to a pulsating component included in an inverter input voltage.

In one aspect of the present invention, the operating frequency of the inverter is adjusted in a way in which the product of voltage and time in one half cycle of the inverter output voltage becomes equal to that in the next adjacent half cycle of the inverter output voltage.

In a preferred embodiment of the inverter control apparatus according to the present invention, the slip frequency of an associated induction motor is controlled so as to change the output frequency of the inverter, thereby adjusting the operating frequency of the inverter in a way in which the product of voltage and time in one half cycle of the inverter output voltage becomes equal to that in the next adjacent half cycle of the inverter output voltage.

Thus, an unbalance between the adjacent positive and negative half cycles of the inverter output voltage attributable to the pulsating component included in the inverter input voltage can be greatly decreased so as to minimize the beat phenomenon of the inverter output voltage.

BRIEF DESCRIPTION OF THE DRAWINGS

FIGS. 2 to 11 illustrate the operation of the embodiment of the present invention shown in FIG. 1 in which:

FIGS. 2A, 2B and 2C illustrate the principle of pulse width modulation by comparison between sine wave signals and a triangular wave signal;

FIG. 3 shows the number of pulses and a corresponding inverter output voltage relative to a reference frequency command for the output frequency of the inverter;

FIGS. 5A, 5B, 5C and 5D illustrate how a beat phenomenon of the inverter output voltage is suppressed;

FIG. 8 shows the results of simulation of the peak current of the induction motor;

FIG. 9 shows the results of simulation of pulsation of the torque of the induction motor;

FIG. 10 is a circuit diagram showing the practical structure of the detectors 141 and 142 used for detecting the pulsating component and d.c. component respectively of the inverter input voltage; and FIG. 11 shows the gain and phase characteristics of the detector used for detecting the pulsating component of the inverter input voltage.

DESCRIPTION OF THE PREFERRED EMBODIMENTS

Figure 1:
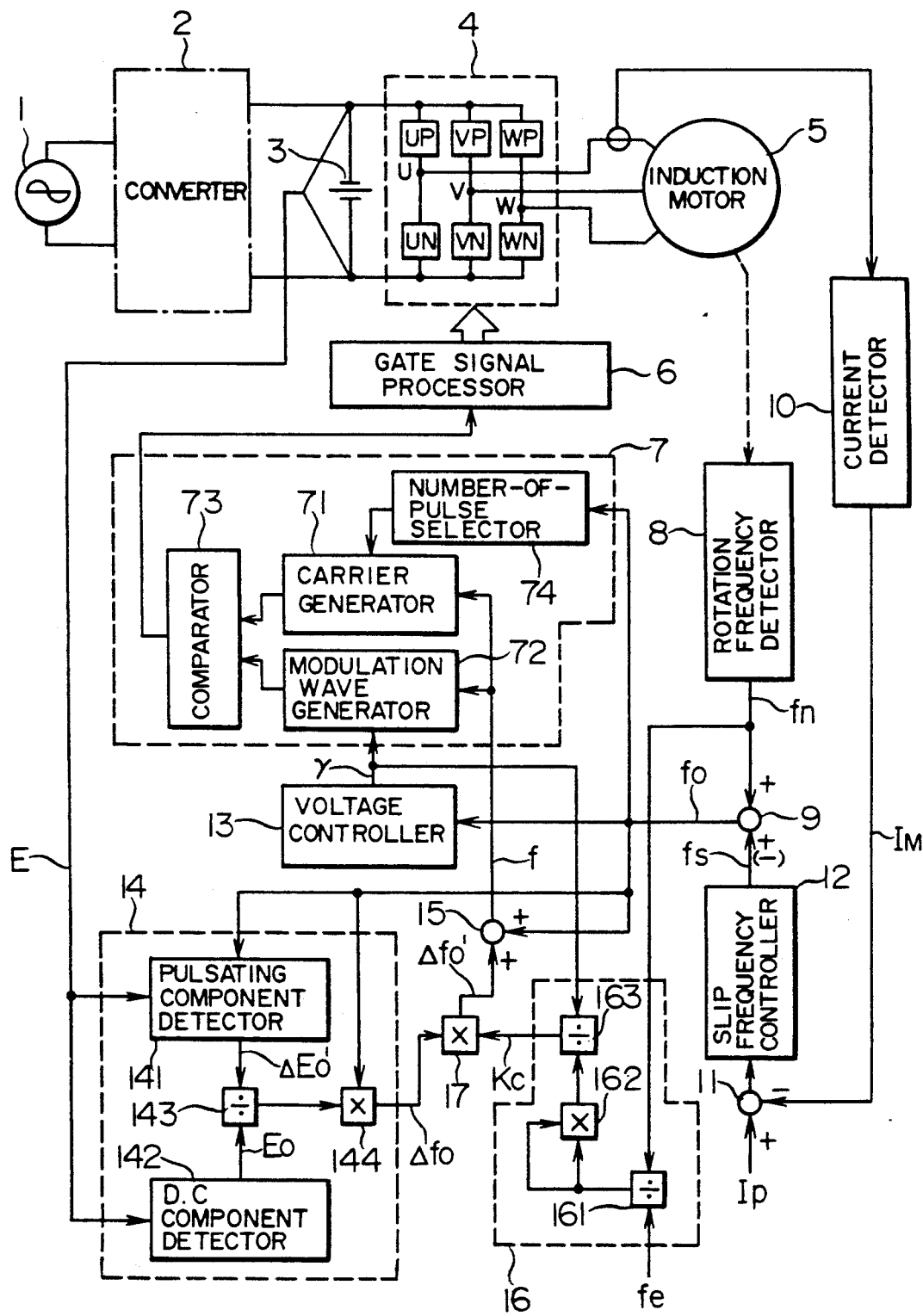
FIG. 1 is a block circuit diagram of an embodiment of the inverter control apparatus of the present invention when used to control an induction motor.

FIG. 1 is a block circuit diagram of a preferred embodiment of the inverter control apparatus when used to control an induction motor.

Referring to FIG. 1, an a.c. voltage supplied from an a.c. power source 1 is converted by an a.c.-d.c. converter 2 into a d.c. voltage, and the d.c. output voltage of the converter 2 is smoothed by a filter capacitor 3. A pulse width modulation inverter 4 converts the smoothed d.c. input voltage into a variable a.c. voltage having a variable frequency. The inverter 4 is composed of control switching elements UP to WN which may be GTO thyristors. An induction motor 5 is energized by the inverter 4. A modulation unit 7 includes a carrier generator 71, a modulation wave generator 72, a comparator 73 and a number-of-pulse selector 74. The output of the modulation unit 7 is applied through a gate signal processing circuit 6 to the inverter 4 to turn on-off the control switching elements UP to WN of the inverter 4 according to a predetermined sequential order.

In FIG. 1, a rotation frequency detector 8 detects the rotation frequency fn of the induction motor 5. An adder/subtracter 9 adds a slip frequency command fs to the detected value of the rotation frequency fn when the induction motor 5 is in its power running mode, but substracts the slip frequency command fs from the detected value of fn when the induction motor 5 is in its regenerative mode. The resultant output of the adder/subtracter 9 provides a reference frequency command fo (=fn±fs) for the output frequency of the inverter 4. A current detector 10 detects the value Im of current of the induction motor 5, and this detected current value Im is compared with a current command Ip in a comparator 11 which finds the difference between Im and Ip. A slip frequency control unit 12 controls the slip frequency command fs on the basis of the detected difference between Im and Ip.

Figure 2:
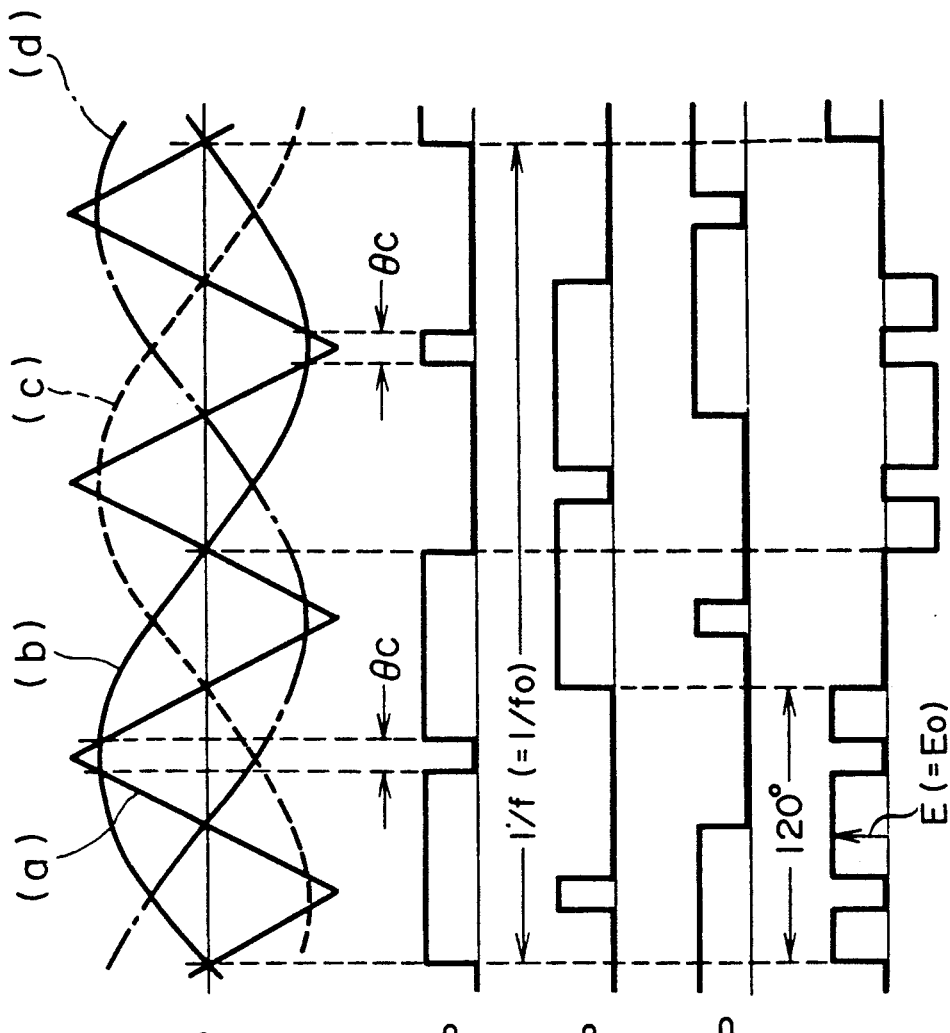

The reference frequency command output fo of the adder/subtracter 9 commanding the output frequency f of the inverter 4 is applied to the modulation unit 7. In response to the application of the reference frequency command fo to the modulation unit 7, the modulation wave generator 72 generates U-phase, V-phase and W-phase sine wave signals as shown by (b), (c) and (d) respectively in FIG. 2A, and the carrier generator 71 generates a triangular wave signal as shown by (a) in FIG. 2A. The comparator 73 compares the sine wave signals with the triangular wave signal and generates pulses as shown in FIG. 2B. These pulses are used to trigger the control switching elements UP, VP and WP. Pulses applied to trigger the control switching elements UN, VN and WN have inverted waveforms of those shown in FIG. 2B.

Figure 3:
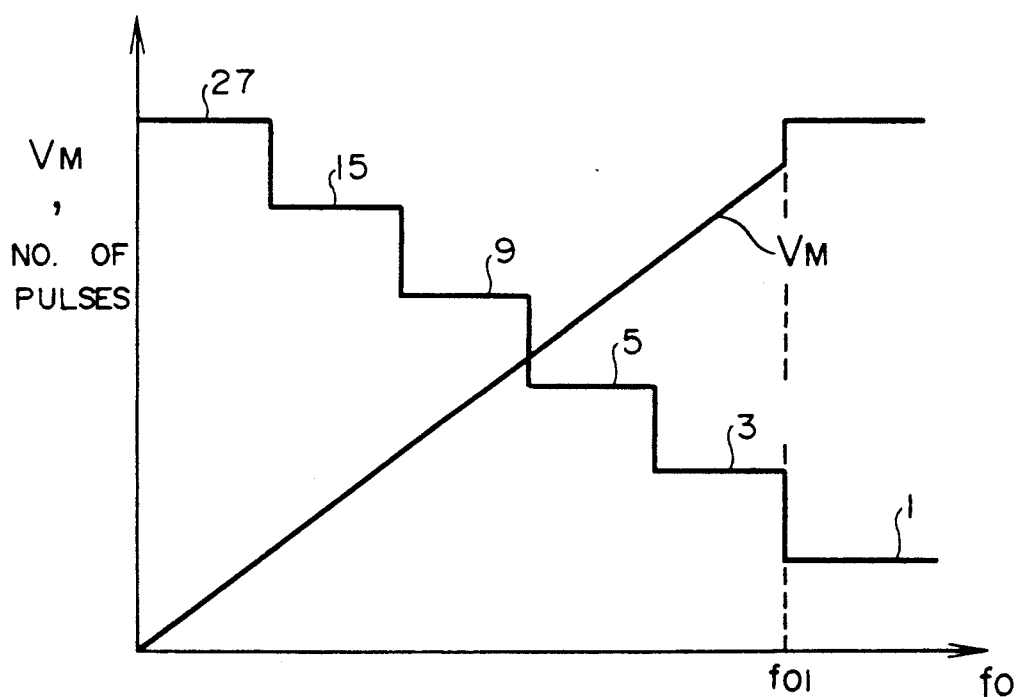

Suppose that the input voltage E of the inverter 4 includes its d.c. component Eo only and does not include any pulsating component ΔEo. In this case, the U-V output voltage of the inverter 5 has a waveform as shown in FIG. 2C, and there is no unbalance between the positive and negative half cycles of the output voltage. The output voltage of the inverter 4 is controlled by controlling the width $\theta c$ shown in FIG. 2B, that is, by controlling the peak value of the sine wave signals shown in FIG. 2A. Further, the number of pulses included in each half cycle of the output frequency f of the inverter 4, which frequency f is now equal to the output frequency fo of the adder/subtracter 9, is controlled by the number-of-pulse selector 74 which changes over the ratio between the frequency of the triangular wave signal and that of the sine wave signals, that is, the frequency of the triangular wave signal shown in FIG. 2A. In the example shown in FIG. 2C, the number of pulses is three. FIG. 3 shows the relation between the number of pulses and the output fo of the adder/subtracter 9 providing the reference value of the output frequency f of the inverter 4. The number-of-pulse selector 74 changes over the number of pulses in the order of, for example, 27-15-9-5-3-1 as shown in FIG. 3. A voltage control unit 13 calculates the ratio between the peak value of the sine wave signals and that of the triangular wave signal shown in FIG. 2A. That is, the voltage control unit 13 calculates the modulation factor $\beta$ to control the peak value of the sine wave signals, so that, as shown in FIG. 3, the output voltage $V_M$ of the inverter 4 changes continuously relative to the output fo of the adder/subtracter 9 providing the reference value of the output frequency f of the inverter 4. It will be seen in FIG. 3 that the output voltage $V_M$ of the inverter 4 shows a jump when the number of pulses is changed over to one from three. This is because a certain length of time is required until the control switching elements UP to WN are completely turned off, and, therefore, the number of pulses cannot be continuously controlled until the width $\theta c$ shown in FIG. 2B becomes zero, that is, until the output voltage $V_M$ of the inverter 4 attains its maximum level where the number of pulses is one.

Figure 4A:
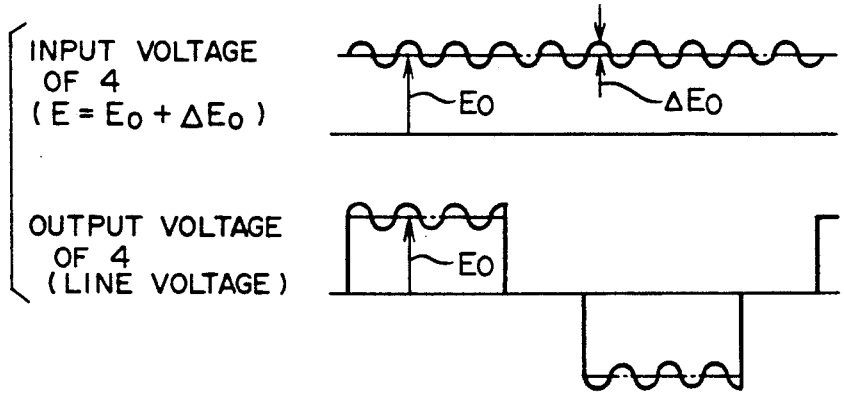
FIGS. 4A, 4B and 4C show the relation between the waveform of the inverter input voltage and that of the inverter output voltage.
Figure 4B:
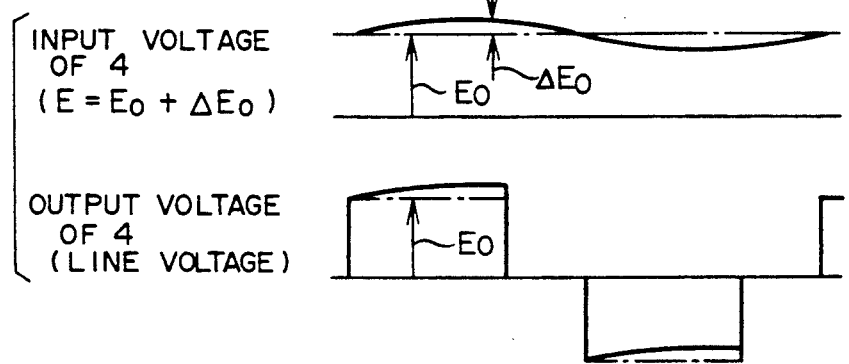
Figure 4C:
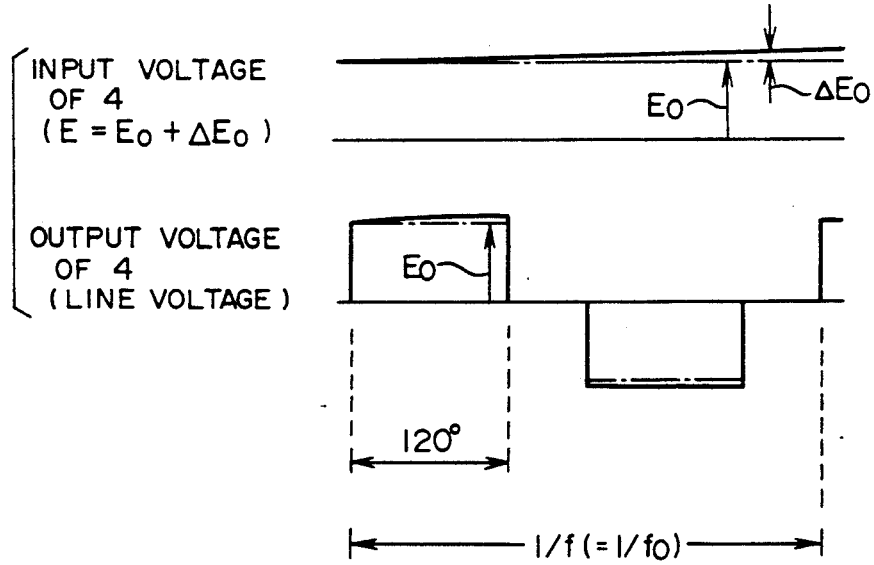

Even when the filter capacitor 3 for smoothing the d.c. voltage is connected to the output of the converter 2, the input voltage E of the inverter 4 includes a pulsating component ΔEo attributable to ripples appearing during rectification. Although this pulsating component ΔEo can be suppressed by increasing the capacity of the filter capacitor 3, it cannot be completely removed. The increase in the capacity results in a correspondingly large size of the filter capacitor 3. Therefore, when the pulsating component Eo is taken into account, the input voltage E of the inverter 4 is expressed as E (=the d.c. component Eo+the pulsating component ΔEo), the relation between the input voltage E and the output voltage (the line voltage) of the inverter 4 is as shown in FIGS. 4A to 4C. In FIGS. 4A to 4C, it is supposed that the modulation factor $\gamma$(=the ratio between the peak value of the sine wave signals and that of the triangular wave signal) is $\gamma \geq 1$ in FIG. 2A, and the commanded output frequency f of the inverter 4 is equal to the output fo of the adder/subtracter 9. FIG. 4A shows the relation between the input and output voltages of the inverter 4 when the frequency fe of the pulsating component ΔEo (which frequency is constant as it is attributable to ripples occurring during rectification) is higher than the output fo of the adder/subtracter 9. FIG. 4C shows the above relation when the frequency fe of the pulsating component ΔEo is lower than the output fo of the adder/subtracter 9. In each of FIGS. 4A and 4C, there is substantially no unbalance between the positive and negative half cycles of the output voltage of the inverter 4. The condition that the frequency fe of the pulsating component ΔEo is higher than the output fo of the adder/subtracter 9 appears when the rotation speed of the induction motor 5 is in its low speed range, and the number of pulses is generally large as will be seen in FIG. 3. The fact that no unbalance occurs between the positive and negative half cycles of the output voltage of the inverter 4 even in such a case can be readily understood from FIG. 4A. FIG. 4B shows the relation between the input and output voltages of the inverter 4 when the frequency fe of the pulsating component ΔEo is approximately equal to the output frequency f of the inverter 4 (=the output fo of the adder/subtracter 9). In this case, an unbalance occurs between the positive and negative half cycles of the output voltage of the inverter 4. The magnitude of this unbalance changes in proportion to the difference between the frequency fe of the pulsating component ΔEo and the output frequency f of the inverter 4 (=the output fo of the adder/subtracter 9). That is, a beat phenomenon occurs in the output voltage of the inverter 4.

A frequency adjusting unit 14 is provided to adjust the output frequency f of the inverter 4. The frequency adjusting unit 14 includes a d.c. component detector, 142 detecting the d.c. component Eo of the input voltage, E of the inverter 4 and a pulsating or ripple component detector 141 detecting the pulsating or ripple component ΔEo of the input voltage E of the inverter 4 with a predetermined phase difference $\alpha$. The output ΔEo' (|Eo'|=|ΔEo|) of the detector 141 is divided in a divider 143 by the output Eo of the detector 142. Then, the output of the divider 143 is multiplied in a multiplier 144 by the output fo of the adder/subtracter 9, and an adjusting factor Δfo (=ΔEo' fo/Eo) for adjusting the output frequency f of the inverter 4 appears from the frequency adjusting unit 14.

The output Δfo of the frequency adjusting unit 14 adjusting the output frequency f of the inverter 4 is added in an adder 15 to the output fo of the adder/subtracter 9 to provide the frequency command f (=fo+Δfo) commanding the output frequency of the inverter 4. Suppose that the ripple factor of the input voltage E of the inverter 4 is K, and the pulsating component ΔEo of the inverter input voltage E pulsates in a sinusoidal fashion with the frequency fe. Then, the input voltage E of the inverter 4 and the frequency command f commanding the output frequency of the inverter 4 are expressed as follows, respectively:

$$E = Eo + \Delta Eo = Eo + KEo \sin(2\pi f_e t) \quad (1)$$

$$\begin{aligned} f &= fo + \Delta fo = fo + \Delta Eo' \cdot fo/fo \\ &= fo + Kfo\sin(2\pi f_e t + a) \end{aligned} \quad (2)$$

When the frequency command f for the output frequency of the inverter 4 is applied to the modulation unit 7, the modulation wave generator 72 generates U-phase, V-phase and W-phase modulation wave signals $G_U$, $G_V$ AND $G_W$ expressed as follows respectively:

$$\left.\begin{aligned} G_U &= \gamma\sin(\theta) \\ G_V &= \gamma\sin(\theta - 2\pi/3) \\ G_W &= \gamma\sin(\theta - 4\pi/4) \end{aligned}\right\} \quad (3)$$

$$\begin{aligned} \theta &= 2\pi \int f dt = 2\pi fot + 2\pi \int \Delta fo dt \\ &= 2\pi fot - \frac{Kfo}{fe} \cos(2\pi f_e t + d) \end{aligned} \quad (4)$$

In the equation (3), γ designates the modulation factor (the ratio between the peak value of the modulation wave signals and that of the carrier signal).

FIG. 5A shows the waveform of the input voltage E of the inverter 4, FIG. 5B shows the waveform of the adjusting factor Δfo for adjusting the output frequency f of the inverter 4, and FIG. 5C shows the relation between the outputs $G_U$ and $G_V$ of the modulation wave generator 72. In FIGS. 5A, 5B and 5C, it is supposed that the frequency fe of the pulsating component ΔEo of the input voltage E of the inverter 4 is equal to the output fo of the adder/subtracter 9, and the phase difference α between the pulsating component ΔEo and its detected value ΔEo' (|ΔEo'| = |ΔEo|) is α=0°. It will be especially seen in FIG. 5C that, by the function of the inverter output frequency adjusting factor Δfo included in the second member of the equation (4), the outputs $G_U$ and $G_V$ of the modulation wave generator 72 are now represented by the solid waveforms instead of their previous waveforms represented by the dotted curves. FIG. 5D shows the waveform of the U-V output voltage of the inverter 4 when the number of pulses is one, that is, when the modulation factor γ(=the ratio between the peak value of the sine wave signals and that of the triangular wave signal in FIG. 2A) is γ≥1. It will be seen in FIG. 5D that the inverter output voltage which has been previously represented by the dotted waveform is now represented by the solid waveform, and an unbalance between the positive and negative half cycles of the output voltage of the inverter 4 is greatly decreased.

The amount of unbalance between the positive and negative half cycles of the output voltage of the inverter 4 will be numerically discussed with reference to FIGS. 5A to 5D.

Referring to FIG. 5C, when the outputs of the modulation wave generator 72 are represented by the dotted waveforms, $G_U'$ and $G_V'$, these outputs $G_U'$ and $G_V'$ become zero at times $T_U'$ and $T_V'$ which are expressed as follows respectively:

$$\left.\begin{aligned} T_U'(N) &= \frac{N}{2fo} \\ T_V'(N) &= \frac{N}{2fo} + \frac{1}{3fo} \end{aligned}\right\}(N = 0, 1, 2, \ldots) \quad (5)$$

When the outputs of the modulation wave generator 72 are represented by the solid waveforms, these outputs $G_U$ and $G_V$ become zero at times $T_U$ and $T_V$ which are expressed as follows respectively:

$$\left.\begin{aligned} T_U(N) &= T_U'(N) + \Delta T_U(N) \\ T_V(N) &= T_V'(N) + \Delta T_V(N) \end{aligned}\right\}(N = 0, 1, 2, \ldots) \quad (6)$$

From the equations (3) to (6), $\Delta T_U$ and $\Delta T_V$ in the equation (6) are expressed as follows respectively:

$$\Delta T_U(N) = \frac{K}{2\pi fe} \cos\{2\pi fe(T_U' + \Delta T_U) + d\} \quad (7)$$

$$\Delta T_V(N) = \frac{K}{2\pi fe} \cos\{2\pi fe(T_V' + \Delta T_V) + d\}$$

$$(N = 0, 1, 2, \ldots)$$

Suppose that the output frequency of the inverter is not adjusted by addition of the adjusting factor Δfo to the output fo of the adder/subtracter 9. That is, suppose that the modulation wave generator generates outputs $G_U'$ and $G_V'$ shown by the dotted waveforms in FIG. 5C, and the inverter 4 generates the corresponding output voltage shown by the dotted waveform in FIG. 5D. In this case, the product ET' of voltage and time in one half cycle of the output voltage of the inverter 4 is given by the definite integral of the equation (1), as follows:

$$\begin{aligned} ET'(N) &= \int_{T_U'}^{T_V'} (Eo + \Delta Eo) dt \\ &= \frac{Eo}{3fo} - \frac{KEo}{2\pi fe}\{\cos(2\pi feT_U')\} \\ &= \frac{Eo}{3fo} - K'\sin\left(2\pi(fo - fe)\frac{N}{2fo} - \frac{\pi fe}{3fo}\right) \end{aligned} \quad (8)$$

where $$K' = (-1)^N \frac{KEo}{\pi fe} \sin\left(\frac{\pi fe}{3fo}\right) \quad (9)$$

$N = 0, 2, 4, \ldots$ : positive half cycle
$N = 1, 3, 5, \ldots$ : negative half cycle These equations (8) and (9) show that the amount of unbalance $$\Delta ET \left( = \frac{ET(N) - ET(N+1)}{2} \right)$$

between the positive and negative half cycles of the output voltage of the inverter 4 has a magnitude $|K'|$ when the output fo of the adder/subtracter 9 is close to the frequency fe of the pulsating component $\Delta Eo$ of the input voltage E of the inverter 4, and a beat phenomenon fluctuating with the frequency (fo−fe) occurs. Even if this magnitude K' may be small relative to the first member $\frac{Eo}{3fo}$ of the equation (8), an excessively large current will flow into the induction motor 5 resulting in commutation failure or breakdown of the inverter 4, or the torque of the induction motor 5 will greatly pulsate, because the impedance of the induction motor 5 is small when the value of the frequency (fo−fe) is small.

On the other hand, when the frequency adjusting unit 14 for adjusting the output frequency of the inverter 4 is provided, that is, when the modulation wave generator 72 generates outputs $G_U$ and $G_V$ shown by the solid waveforms in FIG. 5C, and the inverter 4 generates the corresponding output voltage shown by the solid waveform in FIG. 5D, the product ET of voltage and time in one half cycle of the output voltage of the inverter 4 is given by $$ET(N) = \int_{T_U}^{T_V} (Eo + \Delta Eo) dt = \int_{T_U' + \Delta T_U}^{T_V' + \Delta T_V} (Eo + \Delta Eo) dt = \frac{Eo}{3fo} + \frac{KEo}{2\pi fo}[\cos\{2\pi fe(T_V' + \alpha)\} - \cos\{2\pi fe(T_U' + \alpha)\}] + \frac{KEo}{2\pi fe}[\cos\{2\pi fe(T_V' + \Delta T_V) + \alpha\} - \cos\{2\pi fe(T_U' + \Delta T_U) + \alpha\}] \quad (10)$$

where
$N = 0, 2, 4, \ldots$ : positive half cycle
$N = 1, 3, 5, \ldots$ : negative half cycle When the phase difference $\alpha$ between the pulsating component $\Delta Eo$ of the input voltage E of the inverter 4 and the output frequency adjusting factor $\Delta fo$ is $\alpha = 0°$, the second member and third member of the equation (10) cancel each other, and the equation (10) is expressed as $$ET(N) = \frac{Eo}{3fo}.$$

Thus, the amount of unbalance $$\left( = \frac{ET(N) - ET(N+1)}{2} \right)$$

between the positive and negative half cycles of the output voltage of the inverter 4 is equal to zero, and an undesirable beat phenomenon of the output voltage of the inverter 4 is suppressed.

In an electric railway car using an inverter, the inverter is saturated with its maximum voltage at a speed about ½ of the rated speed of the car, and the frequency only is controlled at higher speeds, in order to enhance the voltage withstand capability of GTO thyristors constituting the inverter. Therefore, at speeds higher than about ½ of the rated speed of the car, the inverter is placed in the stage of single pulse control where adjustment of the output voltage of the inverter is impossible. On the other hand, the output frequency of the inverter is continuously changed over the entire speed range of the car. Therefore, when the a.c. power source 1 shown in FIG. 1 supplies an a.c. voltage of single phase having a frequency of 50 Hz, the frequency of ripples produced during rectification in the converter 2 is 100 Hz. In the speed range in which the output frequency of the inverter 4 passes this frequency of 100 Hz, the inverter 4 has already been placed in the stage of single pulse control (fo≧fo1 in FIG. 3).

By application of the aforementioned principle of the present invention to such a case, the beat phenomenon between the frequency of ripples included in the output of the converter 2 and the frequency of the output of the inverter 4 can be effectively suppressed, so that the speed of the electric railway car using the inverter can be smoothly controlled.

In order to confirm the effectiveness of the control according to the embodiment of the present invention described above, a super computer was used for digital simulation of the performance of the apparatus under the following conditions. The induction motor 5 had a capacity of 130 KW with its voltage rating of 1,100 V, current rating of 86.7 A and frequency rating of 75 Hz, and its slip frequency command fs was maintained constant at 3 Hz. The input voltage E of the inverter 4 was expressed by the equation (1) in which the d.c. component Eo, the ripple factor K and the frequency fe of the pulsating component $\Delta Eo$ were 1,500 V, 6% and 100 Hz respectively.

Figure 6A:
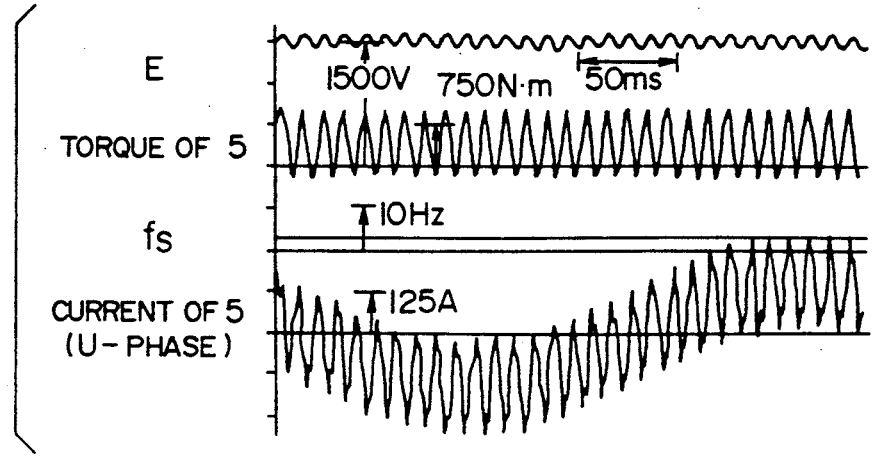
FIGS. 6A, 6B and 6C show simulated waveforms of the current and torque of the induction motor.
Figure 6B:
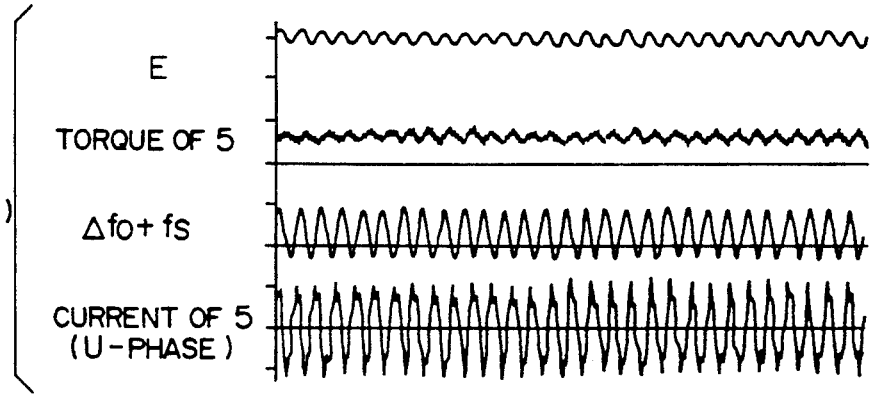
Figure 6C:
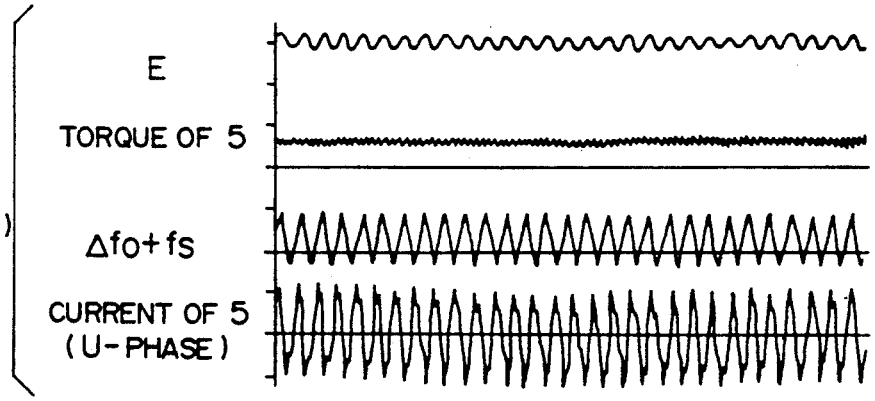

FIGS. 6A to 6C show the results of the digital simulation when the reference frequency command fo for the output frequency of the inverter 4 was 103 Hz. (The rotation frequency fn of the induction motor 5 was fn=100 Hz). FIG. 6A shows the result of the digital simulation when the adjusting factor $\Delta fo$ for adjusting the output frequency of the inverter 4 was not used. It will be seen in FIG. 6A that the current of the induction motor 5 beats greatly with the frequency (fo−fe)=3 Hz due to an unbalance between the positive and negative half cycles of the output voltage of the inverter 4 as described already. It will also be seen in FIG. 6A that the torque of the induction motor 5 pulsates greatly with the frequency fe (=100 Hz) of the pulsating component $\Delta Eo$ of the input voltage E of the inverter 4. FIG. 6B shows the result of the digital simulation when the frequency command f for the output frequency of the inverter 4 was adjusted by the output $\Delta fo$ of the frequency adjusting unit 14 provided for adjusting the output frequency of the inverter 4, and the value of $\alpha$ in the equation (2) was set at $\alpha=0°$. It will be seen in FIG. 6B that the beat phenomenon of the current of the induction motor 5 is substantially eliminated. It will also be seen in FIG. 6B that, although the torque of the induction motor 5 pulsates still slightly, the degree of torque pulsation is greatly decreased as compared to that shown in FIG. 6A. FIG. 6C shows the result of the digital simulation when the value of $\alpha$ in the equation (2) was finally set at $\alpha=-5°$ so as to further decrease the degree of pulsation of the torque of the induction motor 5. It will be seen in FIG. 6C that the current of the induction motor 5 is substantially beat-free as in the case of FIG. 6B, and the torque of the induction motor 5 is substantially free from pulsation. Thus, it has been found that, from the aspect of minimizing the pulsation of the torque of the induction motor 5, $\alpha$ in the equation (2) is preferably set at a suitable value.

Figure 7A:
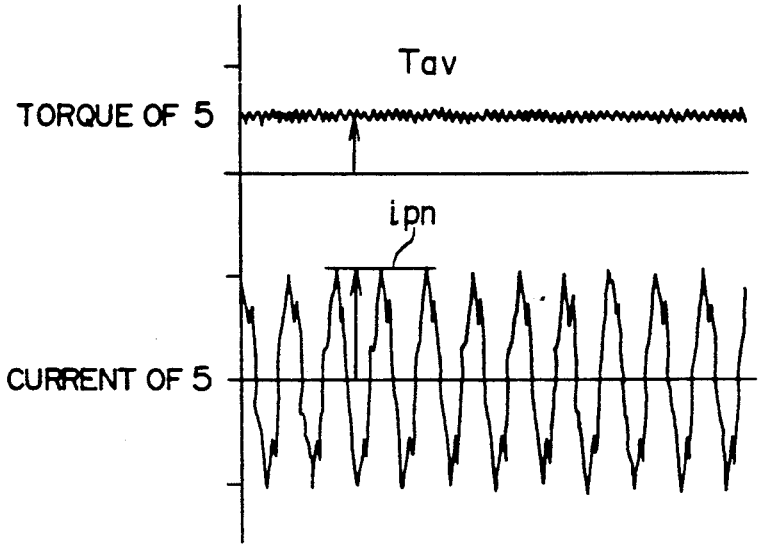
FIGS. 7A and 7B illustrate the definition of symbols relating to the current and torque of the induction motor.
Figure 7B:
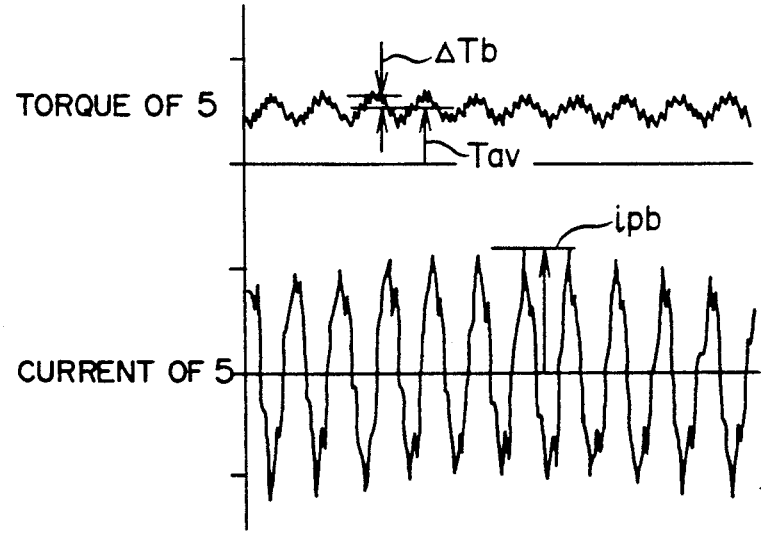
Figure 8:
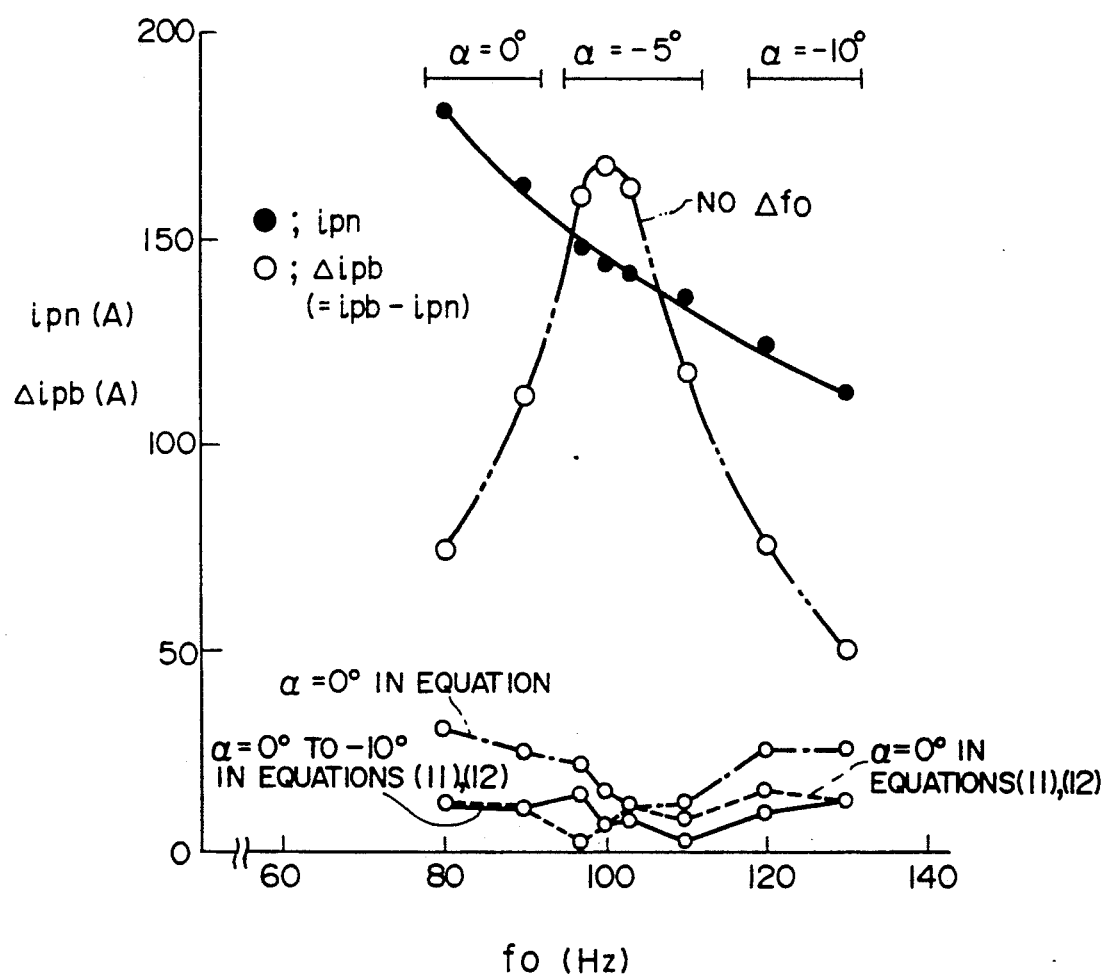
Figure 9:
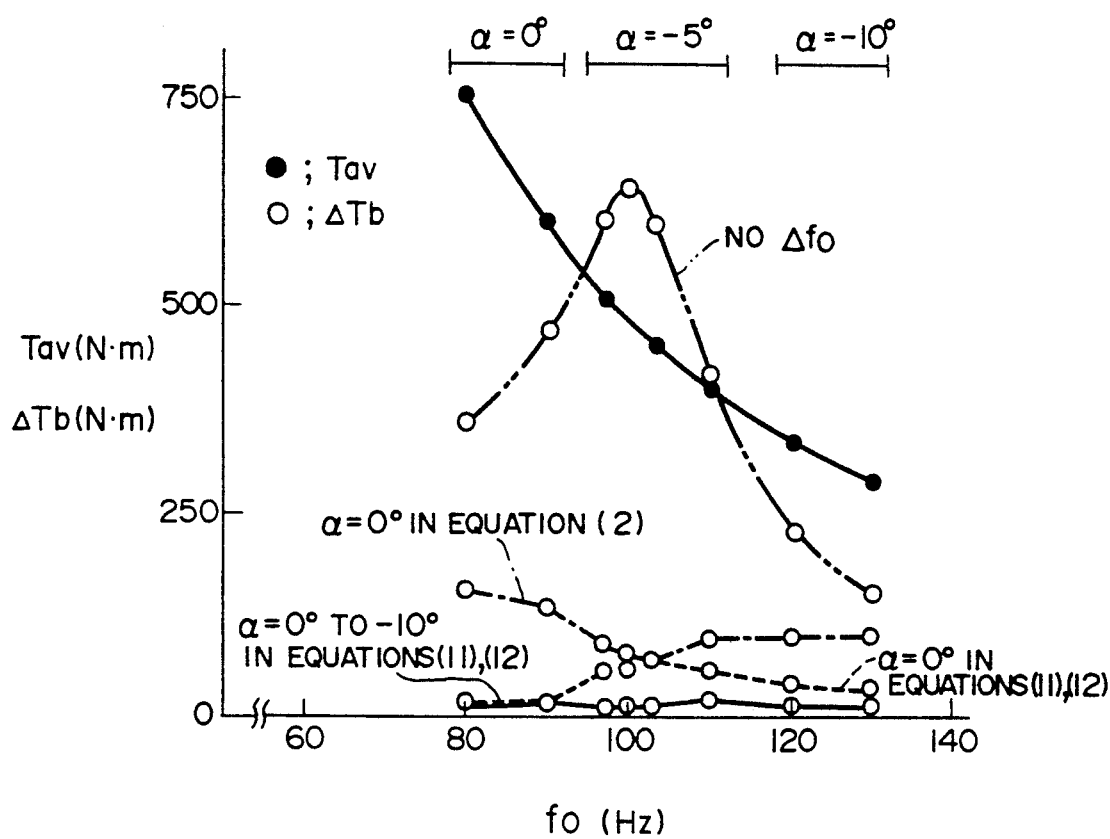

The symbols relating to the current and torque of the induction motor 5 are defined as shown in FIGS. 7A and 7B. In FIG. 7A, the peak current and average torque of the induction motor 5, when no pulsating component $\Delta E_o$ is included in the input voltage E of the inverter 4, are defined as $i_{pn}$ and $T_{av}$ respectively. On the other hand, in FIG. 7B, an increment of the peak current of the induction motor 5 and an amount of pulsation on ripple of the torque of the induction motor 5, when the input voltage E of the inverter 4 includes a pulsating component $E_o$, are defined as $\Delta i_{pb} (=i_{pb}-i_{pn})$ and $\Delta T_b$ respectively. FIGS. 8 and 9 show the results of simulation of $\Delta i_{pb}$ ($i_{pn}$ and $\Delta T_b$ ($T_{av}$) respectively when the reference frequency command fo for the output frequency of the inverter 4 was set at various values.

It will be seen in FIGS. 8 and 9 that, when the adjusting factor $\Delta fo$ for adjusting the output frequency of the inverter 4 is not used, the increment $\Delta i_{bp}$ (FIG. 8) of the peak current of the induction motor 5 and the ripple $\Delta T_b$ (FIG. 9) of the torque of the induction motor 5 become maximum, as shown by two-dot chain curves, at a point where the reference frequency command fo for the output frequency of the inverter 4 is approximately equal to the frequency fe (=100 Hz) of the pulsating component $\Delta E_o$ of the input voltage E of the inverter 4. The values of $\Delta i_{pb}$ and $\Delta T_b$ are greatly decreased as shown by the one-dot chain curves in FIGS. 8 and 9 when the frequency command f for the output frequency of the inverter 4 is adjusted by the output $\Delta fo$ of the frequency adjusting unit 14 adjusting the output frequency of the inverter 4 while setting the value of $\alpha$ in the equation (2) at a $=0°$. However, in the range where the difference between fo and fe (=100 Hz) is large, the values of $\Delta i_{bp}$ and $\Delta T_b$ are slightly larger than when fo is approximately equal to fe. In order to improve such a situation, a unit 16 is provided for correcting the output $\Delta fo$ of the frequency adjusting unit 14 adjusting the output frequency of the inverter 4. This correcting unit 16 generates an output Kc which is a correction coefficient. The output $\Delta fo$ of the frequency adjusting unit 14 is multiplied in a multiplier 17 by the output Kc of the correcting unit 16, so that the frequency command f for the output frequency of the inverter 4 is now expressed as follows:

$$f = fo + \Delta fo' = fo + Kc\Delta fo \quad (11)$$
$$= fo + KcKfo\sin(2\pi fet + \alpha)$$

Simulation was made using various values of Kc in the equation (11) while maintaining $\alpha$ at $\alpha=0°$. The results of the simulation have proved that the peak current increment $\Delta i_{pb}$ and torque ripple $\Delta T_b$ of the induction motor 5 can be improved as shown by the dotted curves in FIGS. 8 and 9 when the frequency fe of the pulsating component $\Delta E_o$ of the input voltage E of the inverter 4 is divided in a divider 161 by the rotation frequency fn of the induction motor 5, and the output of the divider 161 is squared in a multiplier 162 as follows:

$$Kc=(Fe/fn)^2 \quad (12)$$

In order to further improve the torque ripple $\Delta T_b$ as described with reference to FIGS. 6A to 6C, the value of $\alpha$ in the equations (11) and (12) was changed relative to the reference frequency command fo for the output frequency of the inverter 4 as shown in FIG. 9. The results have proved that the torque ripple $\Delta T_b$ disappears substantially as shown by the solid curve in FIG. 9. In this case, the peak current increment $\Delta i_{pb}$ of the induction motor 5 does not change appreciably as shown by the solid curve in FIG. 8.

The results of simulation described above have referred to the case where the number of pulses in the output voltage of the inverter 4 is one as shown in FIG. 5, and the output (the modulation factor) $\gamma$ of the voltage control unit 13 is $\gamma=1$. Similar results (effects) are obtained even when the number of pulses is larger than one ($\gamma<1$). The results of simulation in such a case have provded that, when the output of the multiplier 162 is divided in a divider 163 by the modulation factor $\gamma$ so that the output (the correction coefficient) Kc of the unit 16 correcting the output $\Delta fo$ of the unit 14 adjusting the output frequency of the inverter 4 is given by $$Kc = \left(\frac{fe}{fn}\right)^2 \cdot \frac{1}{\gamma}, \quad (13)$$

the values of $\Delta i_{pb}$ and $\Delta T_b$ can be more effectively controlled than when Kc is given by the equation (12). When the induction motor 5 is in its starting stage or is rotating in its low speed range, the value of Kc will become excessively large as will be readily apparent from the equation (12) and (13). Therefore, it is preferable to provide an upper limit of the value of Kc.

Figure 10:
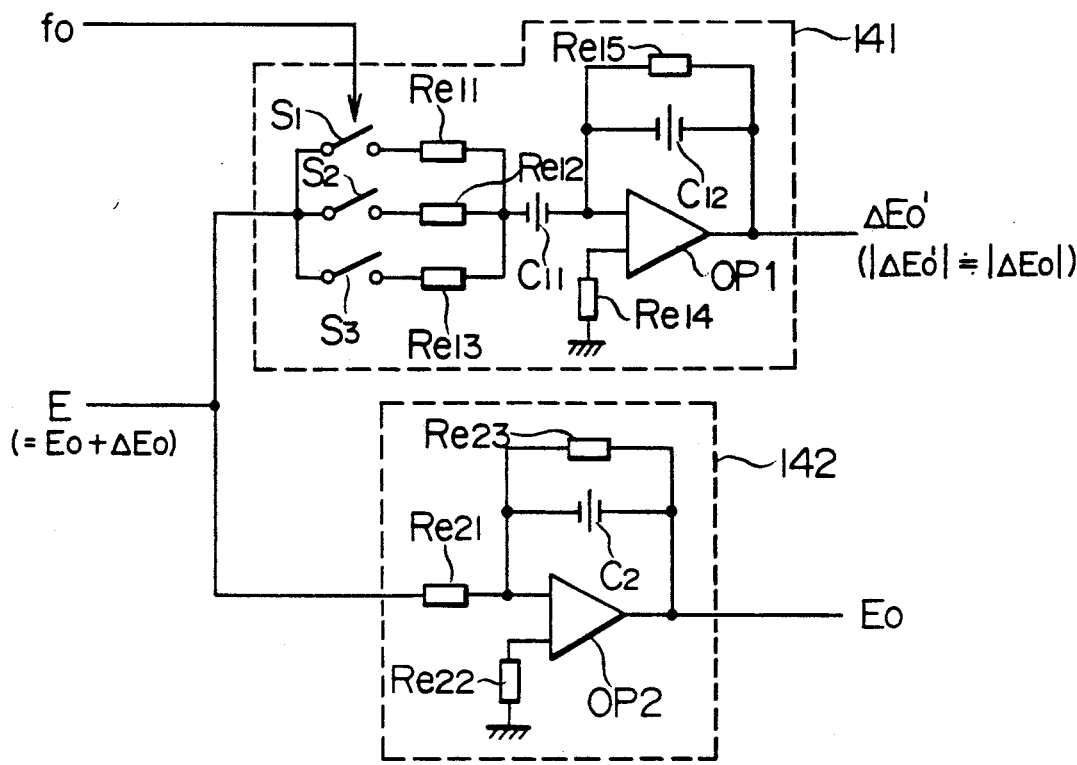
Figure 11:
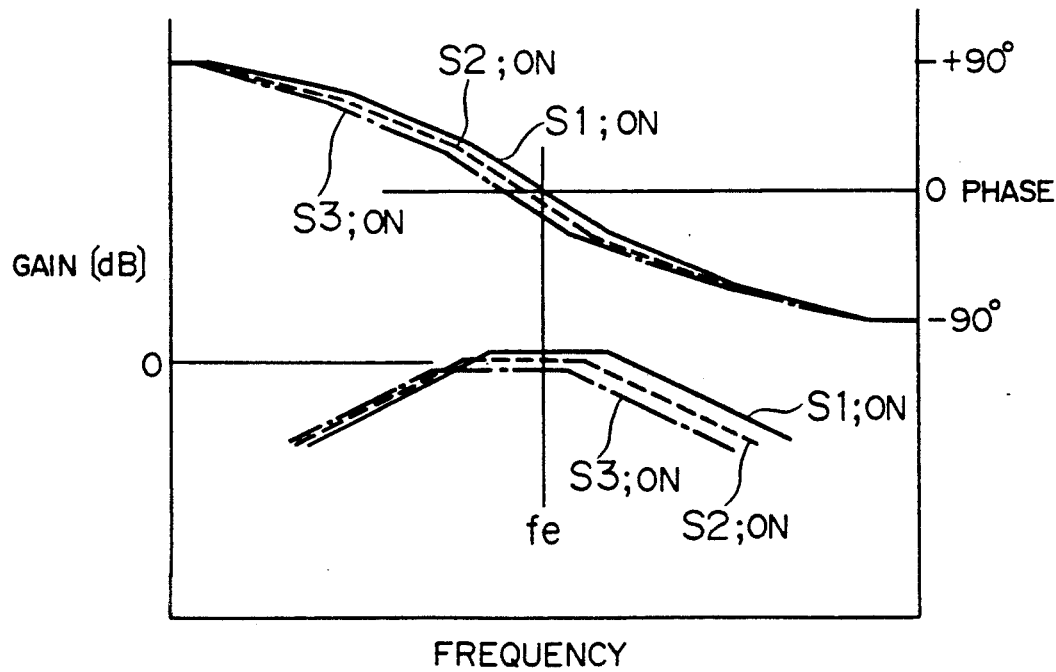

FIG. 10 shows one form of the practical structure of the detector 142 detecting the d.c. component $E_o$ of the input voltage E of the inverter 4 and that of the detector 141 detecting the pulsating component $\Delta E_o$ of the inverter input voltage E. Referring to FIG. 10, the detector 142 detecting the d.c. component $E_o$ of the input voltage E of the inverter 4 is in the form of a smoothing circuit including an operational amplifier OP2, resistors Re 21, Re 22, Re 23 and a capacitor C2. The gain (=Re 23/Re 21) of the smoothing circuit is unity (1), and the time constant (=Re 23×C2) is selected to be large. On the other hand, the detector 141 detecting the pulsating component $\Delta E_o$ of the input voltage E of the inverter 4 is in the form of a band-pass filter circuit including an operational amplifier OP1, resistors Re 11 to Re 15, and capacitors C11, C12. FIG. 11 shows the gain and phase characteristics of this band-pass filter circuit 141. Switches S1, S2 and S3 shown in FIG. 10 are selectively turned on depending on the value of the reference frequency command fo for the output frequency of the inverter 4 as shown in FIG. 11, so that the gain is unity (the value of the input $\Delta E_o \approx$ the value of the output $\Delta E_o'$) at the frequency fe of the pulsating component $\Delta E_o$ of the input voltage E of the inverter 4, and the phase difference $\alpha$ between the pulsating component input $\Delta E_o$ and the output $\Delta fo$ of the unit 14 adjusting the output frequency of the inverter 4 has a value which is appropriate with respect to the reference frequency command fo as described already with reference to FIG. 9.

It will be understood from the foregoing detailed description that the embodiment of the present invention shown in FIG. 1 can suppress a beat phenomenon of the output voltage of the inverter 4 and a beat phenomenon of the current of the induction motor 5 attributable to the pulsating component ΔEo (the rectification ripples in the output voltage of the converter 2) included in the input voltage E of the inverter 4. Therefore, any excessively large current does not flow into the induction motor 5 thereby preventing commutation failure or breakdown of the inverter 4, and the torque ripple of the induction motor 5 can also be suppressed to ensure smooth operation of the induction motor 5.

The embodiment shown in FIG. 1 has referred to the case where the number of pulses in the output voltage of the inverter 4 is one as described with reference to FIG. 5. However, it is apparent that the aforementioned effects of the present invention are exhibited even when the number of pulses is larger than one.

As described above, the present invention can suppress a beat phenomenon of the output voltage of the inverter and a beat phenomenon of the current of the induction motor attributable to the pulsating component (the rectification ripples in the output voltage of the converter) included in the input voltage of the inverter. Therefore, the present invention provides the following advantages:

1) Any excessively large current does not flow into the induction motor.
2) Commutation failure or breakdown of the inverter can be prevented.
3) The torque ripple of the induction motor can be suppressed to ensure smooth operation of the induction motor.

We claim:

1. An apparatus for controlling an induction motor by an inverter comprising:
   an a.c.-d.c. converter;
   a pulse width modulation inverter supplied with power from said converter through a filter circuit to generate an a.c. output;
   an induction motor energized by the output of said inverter;
   rotation frequency detecting means for detecting the rotation frequency of said induction motor;
   slip frequency commanding means for commanding the slip frequency of said induction motor;
   frequency control means for controlling the output frequency of said inverter by adding or subtracting the output of said slip frequency commanding means to or from the output of said rotation frequency detecting means;
   voltage control means for controlling the output voltage of said inverter according to the output of said frequency control means;
   means for detecting a ripple factor of the input voltage of said inverter;
   means for adjusting the output frequency of said inverter according to the output of said voltage ripple-factor detecting means; and
   frequency adjusting-factor correcting means for correcting the output of said frequency adjusting means according to at least one of the output of said rotation frequency detecting means and the output of said voltage control means;
   wherein said frequency adjusting means multiplies the output of said frequency control means by the output of said voltage ripple-factor detecting means, multiplies then the result of multiplication by the output of said frequency adjusting-factor correcting means, and adds the latter result of multiplication to the output of said frequency control means.

2. An apparatus for controlling an induction motor by an inverter comprising:
   an a.c.-d.c. converter;
   a pulse width modulation inverter supplied with power from said converter through a filter circuit to generate an a.c. output;
   an induction motor energized by the output of said inverter;
   rotation frequency detecting means for detecting the rotation frequency of said induction motor;
   slip frequency commanding means for commanding the slip frequency of said induction motor;
   frequency control means for controlling the output frequency of said inverter by adding or subtraction the output of said slip frequency commanding means to or from the output of said rotation frequency detecting means;
   voltage control means for controlling the output voltage of said inverter according to the output of said frequency control means;
   means for detecting a ripple factor of the input voltage of said inverter;
   means for adjusting the output frequency of said inverter according to the output of said voltage ripple-factor detecting means; and
   frequency adjusting-factor correcting means for correcting the output of said frequency adjusting means according to at least one of the output of said rotation frequency detecting means and the output of said voltage control means;
   wherein said frequency adjusting-factor correcting means includes:
   dividing means for dividing the frequency of a rectification ripple component of the input voltage of said inverter by the output of said rotation frequency detecting means; and
   multiplying means for squaring the output of said dividing means.

3. An apparatus for controlling an induction motor by an inverter comprising:
   an a.c.-d.c. converter;
   a pulse width modulation inverter supplied with power from said converter through a filter circuit to generate an a.c. output;
   an induction motor energized by the output of said inverter;
   rotation frequency detecting means for detecting the rotation frequency of said induction motor;
   slip frequency commanding means for commanding the slip frequency of said induction motor;
   frequency control means for controlling the output frequency of said inverter by adding or subtracting the output of said slip frequency commanding means to or from the output of said rotation frequency detecting means;
   voltage control means for controlling the output voltage of said inverter according to the output of said frequency control means;
   means for detecting a ripple factor of the input voltage of said inverter;
   means for adjusting the output frequency of said inverter according to the output of said voltage ripple-factor detecting means; and
   frequency adjusting-factor correcting means for correcting the output of said frequency adjusting means according to at least one of the output of said rotation frequency detecting means and the output of said voltage control means;

wherein said frequency adjusting-factor correcting means includes:

first dividing means for dividing the frequency of a rectification ripple component of the input voltage of said inverter by the output of said rotation frequency detecting means;

multiplying means for squaring the output of said first dividing means; and second dividing means for diving the output of said multiplying means by the output of said voltage control means.

4. An inverter control apparatus comprising:

a converter for converting an alternating current to a direct current;

a pulse width modulation (PWM) inverter supplied with electric power from said converter;

means for commanding an output frequency of said inverter;

means for controlling the output frequency of said inverter in accordance with a frequency command;

voltage control means for controlling an output voltage of said inverter in a variable voltage, variable frequency (VVF) control mode for making the output voltage substantially proportional to the output frequency, and in a constant voltage, variable frequency (CVVF) control mode for fixing the output voltage to a substantially constant value;

means for detecting a rectification ripple of a d.c. input voltage of said inverter; and means for adjusting the output frequency of said inverter in accordance with an output of said rectification ripple detecting means in said constant voltage, variable frequency (CVVF) control mode so that the product of voltage and time in each positive half cycle of the output voltage of said inverter becomes equal to that in the next adjacent negative half cycle of the output voltage of said inverter.

5. An inverter control apparatus according to claim 4, wherein said rectification ripple detecting means includes means for detecting the rectification ripple in a frequency band which contains a rectification ripple frequency produced by said converter.

6. An inverter control apparatus according to claim 5, wherein said rectification ripple detecting means includes a bandpass filter for passing the rectification ripple in the frequency band which contains the rectification ripple frequency due to said converter.

7. An inverter control apparatus according to claim 4, wherein said rectification ripple detecting means includes means for detecting a ripple rate of the d.c. input voltage.

8. An inverter control apparatus according to claim 7, wherein said output frequency adjusting means includes means for adjusting the output frequency of said inverter so that the output frequency has a frequency ripple rate corresponding to said ripple rate of the input voltage.

9. An inverter control apparatus according to claim 8, wherein said output frequency adjusting means adjusts the output frequency so that said frequency ripple rate corresponding to said ripple rate of the input voltage is decreased with an increase in a value representing an operating frequency of said inverter.

10. An inverter control apparatus according to claim 4, wherein said output frequency adjusting means includes means for adjusting the output frequency of said inverter in accordance with an output of said rectification ripple detecting means in both said variable voltage, variable frequency (VVVF) mode and said constant voltage, variable frequency (CVVF) mode.

11. An inverter control apparatus according to claim 4, wherein said rectification ripple detecting means includes means for adjusting a phase difference between an input and an output of said rectification ripple detecting means in accordance with a value representing an operating frequency of said inverter.

12. An inverter control apparatus according to claim 4, wherein said voltage control means includes means for controlling the output voltage of said inverter in the variable voltage, variable frequency (VVVF) control mode in a frequency range lower than said rectification ripple produced by said converter, and in the constant voltage, variable frequency (CVVF) control mode in a frequency range exceeding the frequency range controlled in said VVVF control mode.

13. An inverter control apparatus according to claim 4, further comprising:

an induction motor energized by said inverter;

rotation frequency detecting means for detecting a rotation frequency of said induction motor;

slip frequency commanding means for commanding a slip frequency of said induction motor; and frequency control means for controlling the output frequency of said inverter by adding or subtracting an output of said slip frequency commanding means to or from an output of said rotation frequency detecting means.

14. An inverter control apparatus according to claim 4, wherein said voltage control means includes means controlling the output voltage of said inverter in said VVVF control mode in a frequency range lower than said rectification ripple produced by said converter, and in said CVVF control mode in a frequency range exceeding the frequency range controlled in said VVVF control mode.

15. An inverter control apparatus comprising:

a converter for converting an alternating current to a direct current;

a pulse width modulation inverter supplied with electric power from said converter;

means for commanding an output frequency of said inverter;

means for controlling the output frequency of said inverter in accordance with a frequency command;

voltage control means for said inverter including pulse number selecting means for selecting the number of pulses included in a half-cycle of an output voltage of said inverter in accordance with a value representing an operating frequency of said inverter, said pulse number selecting means selecting one pulse as the pulse number when said operating frequency is equal to or higher than a predetermined frequency (fc);

means for detecting a rectification ripple of a d.c. voltage between said converter and said inverter; and means for adjusting the output frequency of said inverter in accordance with an output of said rectification ripple detecting means in a control mode wherein the pulse number is selected to be one pulse.

16. An inverter control apparatus according to claim 15, wherein said rectification ripple detecting means includes means for detecting the rectification ripple in a frequency band which contains a rectification ripple frequency produced by said converter.

17. An inverter control-apparatus according to claim 16, wherein said rectification ripple detecting means includes a bandpass filter for passing the rectification ripple in the frequency band which contains the rectification ripple frequency due to said converter.

18. An inverter control apparatus according to claim 15, wherein said rectification ripple detecting means includes means for detecting a ripple rate of the d.c. voltage.

19. An inverter control apparatus according to claim 18, wherein said output frequency adjusting means includes means for adjusting the output frequency of said inverter so that the output frequency has a frequency ripple rate corresponding to said ripple rate of the d.c. voltage.

20. An inverter control apparatus according to claim 15, wherein said output frequency adjusting means adjusts the output frequency so that said frequency ripple rate corresponding to said ripple rate of the d.c. voltage is decreased with an increase in a value representing an operating frequency of said inverter.

21. An inverter control apparatus according to claim 15, wherein said output frequency adjusting means includes means for adjusting the output frequency of said inverter in accordance with an output of said rectification ripple detecting means when one pulse is selected and when a pulse number other than one pulse is selected.

22. An inverter control apparatus according to claim 15, wherein said rectification ripple detecting means includes means for adjusting a phase difference between an input and an output of said rectification ripple detecting means in accordance with a value representing an operating frequency of said inverter.

23. An inverter control apparatus according to claim 15, wherein said pulse number selecting means includes means for selecting the number of pulses included in a half-cycle of the output voltage of said inverter to be one pulse in a frequency range not lower than the predetermined frequency (fc) which is lower than a rectification ripple frequency (fe) produced by said converter.

24. An inverter control apparatus according to claim 15, further comprising:
an induction motor energized by said inverter;
rotation frequency detecting means for detecting a rotation frequency of said induction motor;
slip frequency commanding means for commanding a slip frequency of said induction motor; and
frequency control means for controlling the output frequency of said inverter by adding or subtracting an output of said slip frequency commanding means to or from an output of said rotation frequency detecting means.

25. An inverter control apparatus according to claim 24, wherein said pulse number selecting means includes means for selecting the number of pulses included in a half cycle of the output voltage of said inverter to be one pulse in a frequency range not lower than the predetermined frequency (fc) which is lower than a rectification ripple frequency (fe) produced by said converter.

26. An inverter control apparatus comprising:
a converter for converting an alternating current to a direct current;
an inverter supplied with electric power from said converter;
means for detecting a ripple rate of a d.c. voltage between said converter and said inverter; and
means for adjusting the output frequency of said inverter so that a frequency ripple rate of the output frequency is substantially proportional to said ripple rate of the d.c. voltage, said frequency adjusting means being responsive to a value indicative of an operating frequency of said inverter for adjusting the output frequency of said inverter so that said frequency ripple rate which is substantially proportional to said ripple rate of the d.c. voltage is decreased with an increase in the output frequency of said inverter.

27. An inverter control apparatus comprising:
converter for converting an alternating current to a direct current;
an inverter supplied with electric power from said converter;
means for detecting a rectification ripple of a d.c. voltage between said converter and said inverter and providing an output indicative thereof; and
phase shifting means for providing a selected one of a plurality of different phase shift values, said phase shifting means shifting a phase of the output of said rectification ripple detecting means in accordance with the selected one of the plurality of different phase shift values selected in dependence upon an operating frequency of said inverter; and
means for adjusting the output frequency of said inverter in accordance with the output of said phase shifting means.

28. An inverter control apparatus comprising:
a converter for converting an a.c. voltage to a d.c. voltage by rectification, the d.c. voltage having a pulsating component as a rectification ripple;
a pulse width modulation (PWM) inverter for receiving the d.c. voltage from said converter as an input voltage;
means for commanding an output frequency of said inverter and providing a frequency command indicative thereof;
means for controlling the output frequency of said inverter in accordance with the frequency command;
voltage control means for controlling an output voltage of said inverter in a variable voltage, variable frequency (VVVF) control mode for making the output voltage substantially proportional to the output frequency, and in a constant voltage, variable frequency (CVVF) control mode for fixing the output voltage to a substantially constant value;
means for detecting the rectification ripple of the d.c. voltage between said converter and said inverter and providing an output indicative thereof; and
adjusting means responsive to the output of said rectification ripple detecting means for adjusting the output frequency of said inverter so as to minimize an undesirable beat phenomenon of the output voltage of said inverter due to the rectification ripple of the d.c. voltage in said constant voltage, variable frequency (CVVF) control mode.

29. An inverter control apparatus comprising:
a converter for converting an a.c. voltage to a d.c. voltage by rectification, the d.c. voltage having a pulsating component as a rectification ripple;
a pulse width modulation (PWM) inverter for receiving the d.c. voltage from said converter as an input voltage;

means for commanding an output frequency of said inverter and providing a frequency command indicative thereof;

means for controlling the output frequency of said inverter in accordance with the frequency command;

voltage control means for controlling an output voltage of said inverter in a variable voltage, variable frequency (VVVF) control mode for making the output voltage substantially proportional to the output frequency, and in a constant voltage, variable frequency (CVVF) control mode for fixing the output voltage to a substantially constant value;

means for detecting the rectification ripple of the d.c. voltage between said converter and said inverter and providing an output indicative thereof; and adjusting means responsive to the output of said rectification ripple detecting means for adjusting the output frequency of said inverter so as to minimize an undesirable beat phenomenon of the output voltage of said inverter due to the rectification ripple of the d.c. voltage in said constant voltage, variable frequency (CVVF) control mode;

wherein said adjusting means includes means for adjusting an operating frequency of said inverter so that a product of voltage and time in adjacent half cycles of the output voltage of said inverter become substantially equal to one another.

30. An inverter control apparatus comprising:

a converter for converting an a.c. voltage to a d.c. voltage by rectification, the d.c. voltage having a pulsating component as a rectification ripple;

a pulse width modulation (PWM) inverter for receiving the d.c. voltage from said converter as an input voltage;

means for commanding an output frequency of said inverter and providing a frequency command indicative thereof;

means for controlling the output frequency of said inverter in accordance with the frequency command;

voltage control means for said inverter including pulse number selecting means for selecting the number of pulses included in a half-cycle of an output voltage of said inverter in accordance with a value representing an operating frequency of said inverter, said pulse number selecting means selecting one pulse as the pulse number when said operating frequency is equal to or higher than a predetermined frequency;

means for detecting the rectification ripple of the d.c. voltage between said converter and said inverter and providing an output indicative thereof; and adjusting means responsive to the output of said rectification ripple detecting means for adjusting the output frequency of said inverter so as to minimize an undesirable beat phenomenon of the output voltage of said inverter due to the rectification ripple of the d.c. voltage in a control mode wherein the pulse number is selected to be one pulse.

31. An inverter control apparatus comprising:

a converter for converting an a.c. voltage to a d.c. voltage by rectification, the d.c. voltage having a pulsating component as a rectification ripple;

a pulse width modulation (PWM) inverter for receiving the d.c. voltage from said converter as an input voltage;

means for commanding an output frequency of said inverter and providing a frequency command indicative thereof;

means for controlling the output frequency of said inverter in accordance with the frequency command;

voltage control means for said inverter including pulse number selecting means for selecting the number of pulses included in a half-cycle of an output voltage of said inverter in accordance with a value representing an operating frequency of said inverter, said pulse number selecting means selecting one pulse as the pulse number when said operating frequency is equal to or higher than a predetermined frequency;

means for detecting the rectification ripple of the d.c. voltage between said converter and said inverter and providing an output indicative thereof; and adjusting means responsive to the output of said rectification ripple detecting means for adjusting the output frequency of said inverter so as to minimize an undesirable beat phenomenon of the output voltage of said inverter due to the rectification ripple of the d.c. voltage in a control mode wherein the pulse number is selected to be one pulse;

wherein said adjusting means includes means for adjusting the operating frequency of said inverter so that a product of voltage and time in adjacent half cycles of the output voltage of said inverter become substantially equal to one another.

* * * * *